United States Patent [19]
Smith

[11] Patent Number: 5,195,409
[45] Date of Patent: Mar. 23, 1993

[54] BAR FEEDER APPARATUS FOR AUTOMATIC LATHES

[76] Inventor: Roger D. Smith, P.O. Box 689, Cedar Hill, Tex. 75104

[21] Appl. No.: 771,464

[22] Filed: Oct. 4, 1991

[51] Int. Cl.$^5$ ............................................. B23B 15/00
[52] U.S. Cl. .......................................... 82/127; 414/17
[58] Field of Search ...................... 82/126, 127; 92/84; 414/17

[56] References Cited

U.S. PATENT DOCUMENTS

| | | | |
|---|---|---|---|
| Re. 29,905 | 2/1979 | Scheurer | 214/1.2 |
| 3,074,566 | 1/1963 | MacBlane, Sr. | 414/17 |
| 4,365,529 | 12/1982 | Neukomm | 82/127 X |
| 4,406,190 | 9/1983 | Mason | 82/2.5 |
| 4,421,446 | 12/1983 | Leon et al. | 414/17 |
| 4,423,993 | 1/1984 | Eaton | 414/17 |
| 4,507,992 | 4/1985 | Vandevoir et al. | 82/2.7 |
| 4,596,170 | 6/1986 | Vandevoir et al. | 82/38 A |
| 4,621,550 | 11/1986 | Berns | 82/127 |

*Primary Examiner*—Z. R. Bilinsky
*Attorney, Agent, or Firm*—Timmons & Kelly

[57] ABSTRACT

A bar feed apparatus for supplying elongated bar stock to the headstock of an automatic lathe. An elongated guide tube receives the stock and includes a hydraulic piston that controllably advances the stock toward the lathe. For cushioning the rotating bar stock against vibration within the tube, controlled quantities of hydraulic fluid is forced longitudinally into an annular clearance about the piston to and about the bar stock. A flexible seal secured downstream of the piston effects collapse during the forward stoke of the piston and effects a vacuum seal during a vacuum induced return stoke of the piston.

16 Claims, 6 Drawing Sheets

BAR FEEDER APPARATUS FOR AUTOMATIC LATHES

FIELD OF THE INVENTION

The field of art to which the invention relates comprises bar feeders for supplying elongated bar stock to automatic machine tools such as automatic lathes.

BACKGROUND OF THE INVENTION

Where elongated work stock is to be controllably fed to an automatic machine tool, it is common to provide a feed apparatus operable to engage the stock at one end of a guide tube and urge it longitudinally toward and out the other end at a controlled rate to within the work station of the machine tool. In the case of elongated bar stock being fed to an automatic lathe, it is known to utilize an elongated tubular support cylinder in which to receive the bar stock. A displaceable piston within the tube is hydraulically actuated and is located at one end of the tube for advancing the bar stock out the other end into the work station of the lathe. To minimize bar stock vibration during its support within the tube, it is known to supply controlled quantities of hydraulic fluid to within the tube in order to surround the rotating bar and provide cushioning against vibration. Typical apparatus of the foregoing type is disclosed, by the way of example, in U.S. Pat. No. 4,507,992 and U.S. Pat. No. Re. 29,905.

OBJECTS OF THE INVENTION

It is an object of the invention to provide feed apparatus for supplying work stock to an automatic machine tool that includes novel structure for effecting cushioning of the work stock.

It is a further object of the invention to provide a feed apparatus for supplying elongated bar stock to an automatic lathe as in the previous object in which cushioning of the bar stock within a tubular guide is effected by hydraulic fluid supplied longitudinally about the periphery of the bar stock.

SUMMARY OF THE INVENTION

This invention relates to bar feeder apparatus for supplying elongated bar stock to the work station of an automatic lathe. More specifically, the invention relates to a novel structure for supplying cushioning fluid into a guide tube in which the bar stock is contained for the cushioning fluid to flow longitudinally between the bar stock and the guide tube wall to effect rushing of the former.

The foregoing is achieved by a piston/cylinder arrangement permitting hydraulic fluid applied against the piston to also leak controllably about the periphery of the piston head in an annular clearance between the piston head and the tube. With this arrangement, longitudinal flow disperses uniformly about the bar stock to effect cushioning against vibration. A collection box at the output end of the guide tube receives the cushioning fluid for returning it to a reservoir for recycled pumping to the piston. Various structural embodiments of the invention are disclosed.

The above-noted features and advantages of the invention as well as other superior aspects thereof will be further appreciated by those skilled in the art upon reading the detailed description which follows in conjunction with the drawings.

DESCRIPTION OF THE PREFERRED EMBODIMENT

In the description which follows, like parts are marked throughout the specification and drawings with the same reference numerals, respectively. The drawing figures are not necessarily to scale and the proportions of parts in certain views may have been exaggerated for purposes of clarity.

Referring now to FIGS. 1-6 there is disclosed a first embodiment of the invention relating to a bar feeding apparatus designated 10 for supplying bar stock to the head stock (not shown) of an automatic lathe 12 shown in phantom outline. Comprising the apparatus are a pair of spaced apart upright floor stands 14 and 16 on which an elongated horizontally extending angular support member 18 is secured. Within the support member is disposed an elongated guide tube 20 of length greater than the length of support member 18 and in which to receive a length of bar stock 22 to be supplied to lathe 12. Longitudinally spaced collars 23 secure guide tube 20 to angle support 18.

Figure 6:
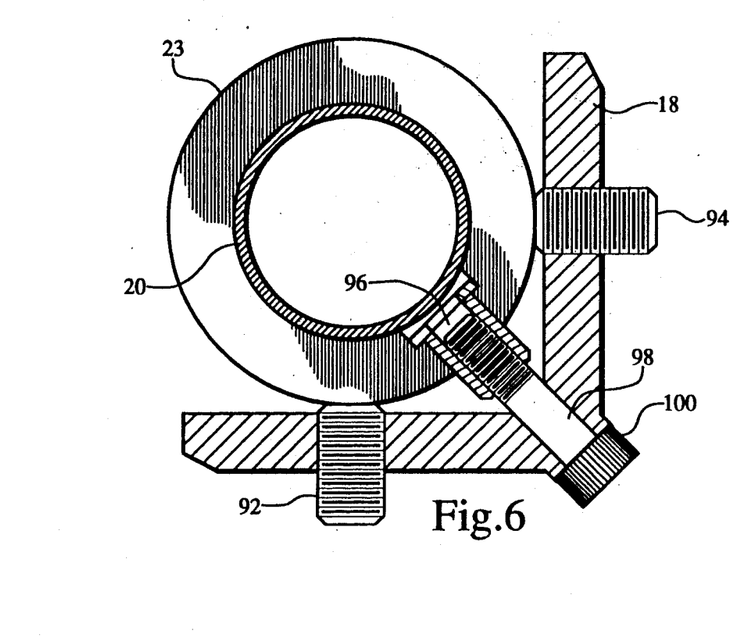
FIG. 6 is an enlarged sectional view through the guide tube support as seen substantially from the position 6—6 of FIG. 1.

Hinge 90 secured to the underside of support member 18 enables the guide tube 20 to be swung out for loading tube 20 with a length of bar stock 22. As best seen in FIG. 6, positioning and alignment of the guide tube is effected via collar 23 that is adjustably aligned by means of normally positioned set screws 92 and 94. A tapped bore 96 within the collar is adapted to receive bolt 98 until the latter seats against angle face 100.

The left end of the guide tube 20 as viewed in the drawings, contains a hydraulically displaceable piston 24. Hydraulic fluid 40 is supplied from a tank reservoir 30 through conduit 26 via a reversible pump 28. The pump extends vertically inward of the reservoir and is adapted when reversed to draw a vacuum for return of the piston as will be explained. Hydraulic fluid received at the outlet end of tube 20 is recovered in a collection box 32 and via conduit 34 is returned by gravity to reservoir 30. Within the reservoir there is provided a screen 36 and a filter 38 by which any chips or other sediment is removed before fresh fluid is supplied via pump 28 to the piston 24.

Piston 24 is urged forward for advancing bar stock 22 toward the headstock of the lathe by hydraulic fluid 40 received from conduit 26 and supplied against the backside 42 of the piston head. For this embodiment, the piston head comprises a metal ring 44 including a central bore 48 through which to receive a stub shaft 50 while a radial counter-bore 52 is engageable against an enlarged annulus 54. The diameter of ring 44 is slightly less than that the internal diameter of tube 20 so as to afford an annular clearance 46 therebetween through which fluid 40 when applied can leak longitudinally about the ring to provide cushioning of bar stock 22.

The rear face of the annulus 54 secures a flexible diaphragm type annular seal 56 positioned against the end face of a cylinder 58 forming the end of a cylinder 60. The latter in turn is secured via cross pin 62 to pusher tube 64 internally secured via a spring pin 66 to socket member 68. The socket member includes a bore 70 in which to receive shank 72 of a feed cone 74 engaging the frustro-conical end of bar stock 22. An annular groove 76 in shank 72 is engaged by a retainer ball 78. In this manner, socket 68 is restrained against rotation while feed cone 74 rotates in conjunction with bar stock 22. O-ring 80 maintains a seal between socket 68 and pusher tube 64. The foregoing elements are all exposed within the guide tube 20 in a manner defining a peripheral clearance 82 extending longitudinally between them and the wall surface of tube 20 for reasons as will be understood.

Figure 1:
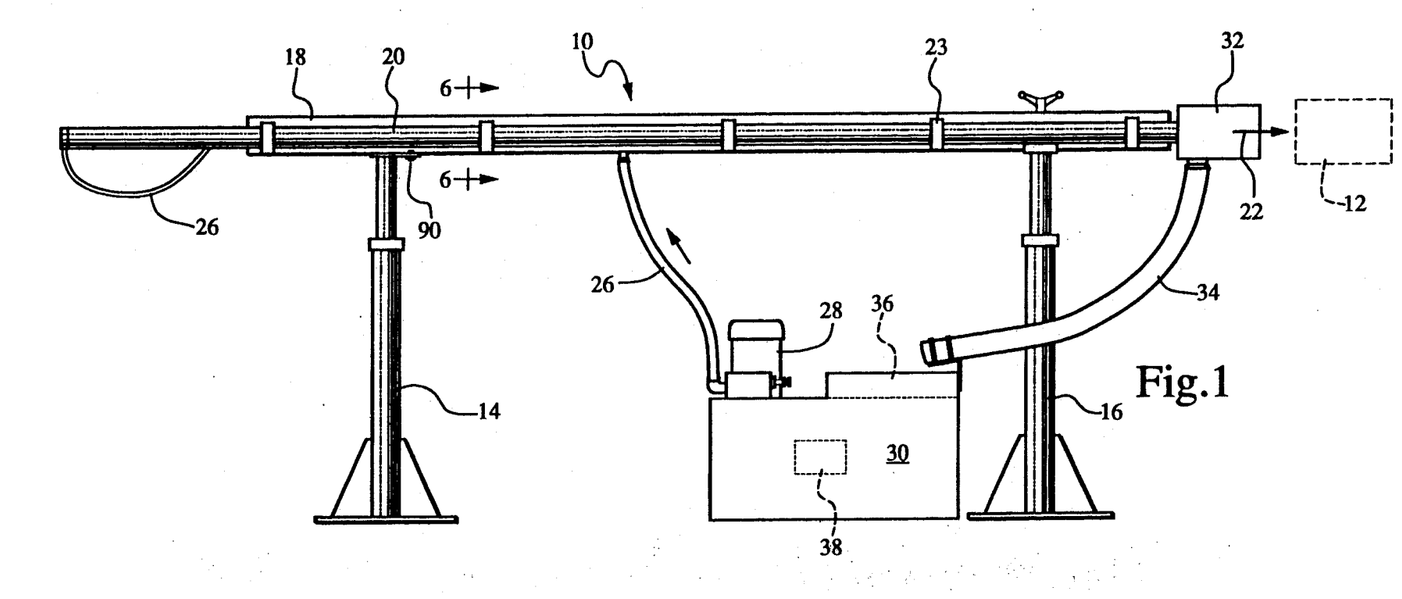
FIG. 1 is a side elevation of a bar feeder apparatus in accordance with the invention.
Figure 2:
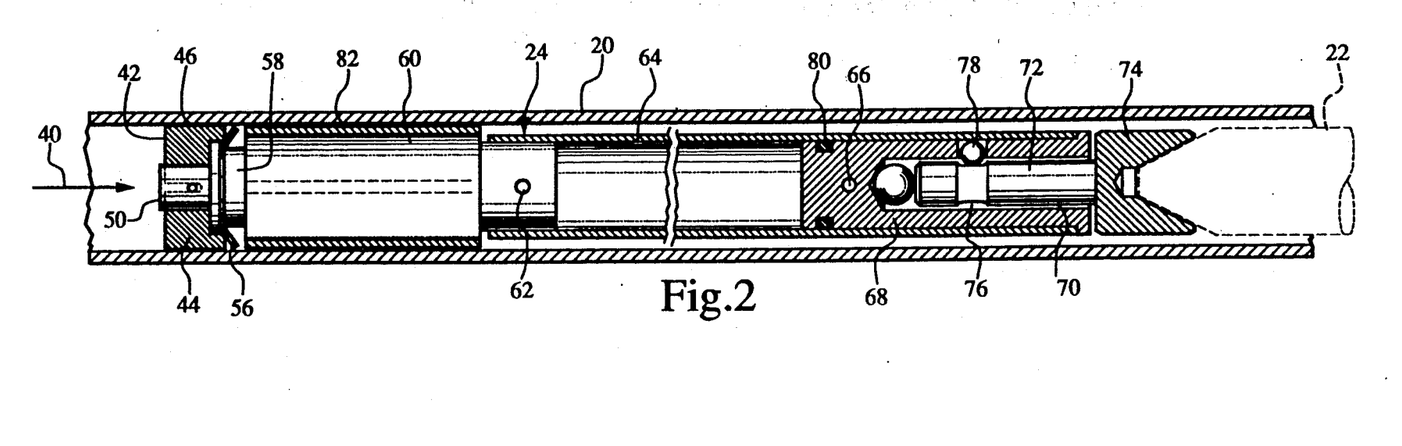
FIG. 2 is a fragmentary longitudinal section through the piston/cylinder section of the feed support.
Figure 3:
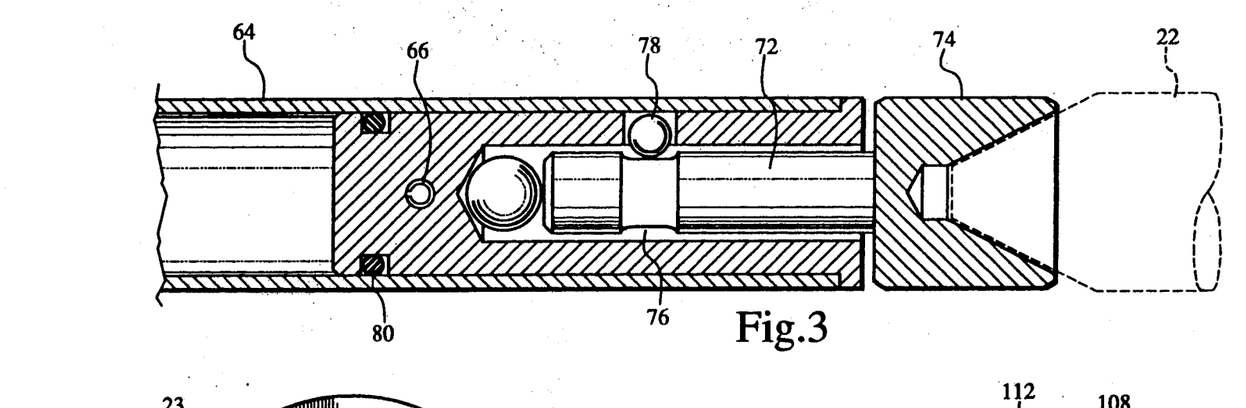
FIG. 3 is a fragmentary longitudinal section through the stock engaging end of the piston apparatus.
Figure 4:
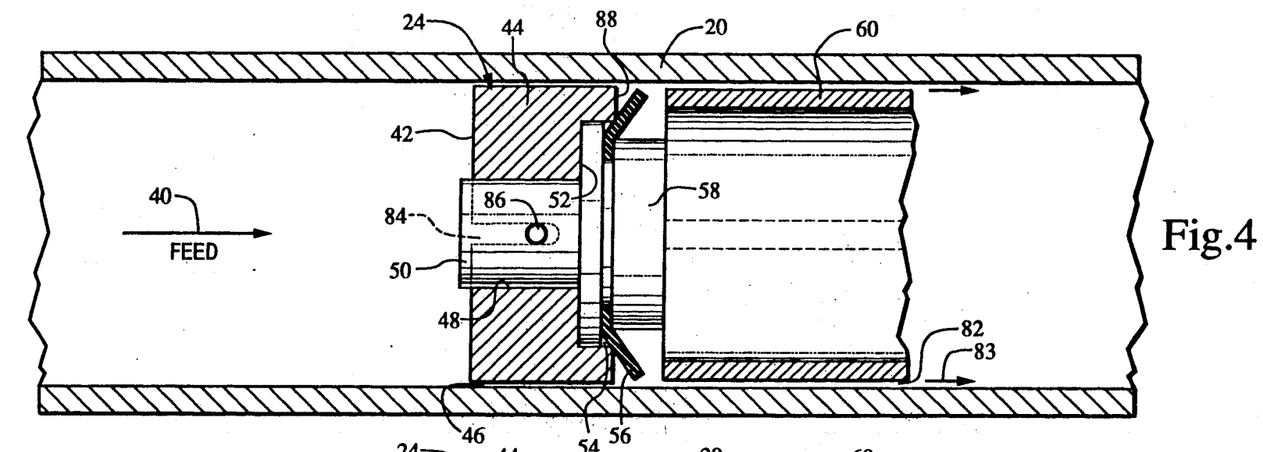
FIGS. 4 and 5 are fragmentary enlarged longitudinal sections of the piston/cylinder for the forward and return orientations respectively of the piston head in accordance with a first embodiment of the invention.
Figure 5:
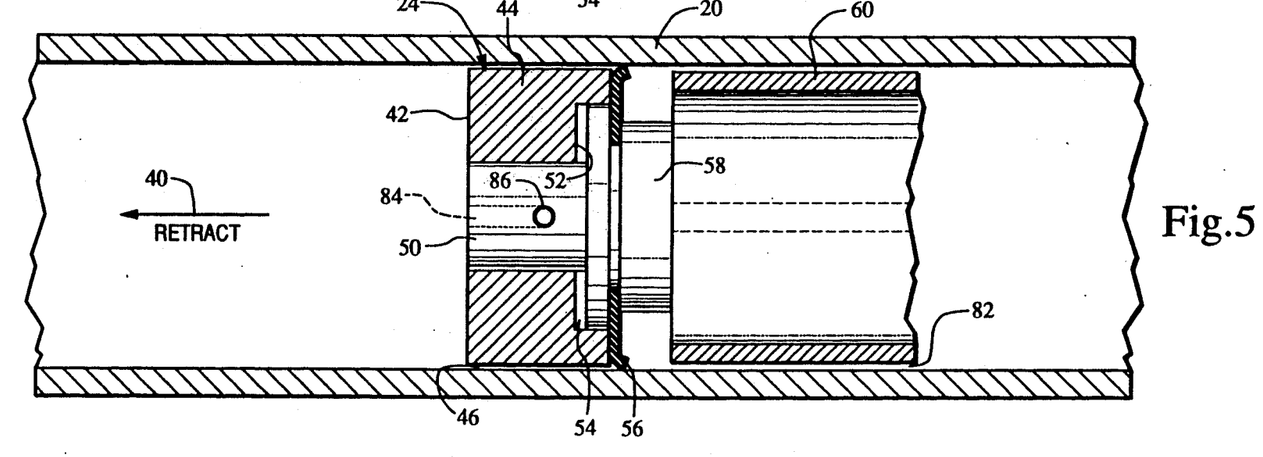
Figure 7:
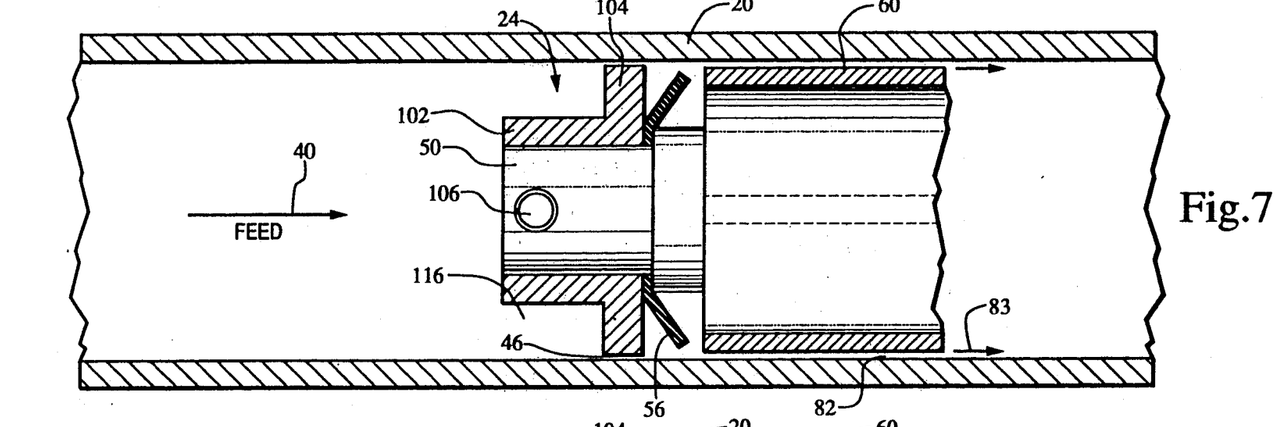
FIGS. 7 and 8 are fragmentary enlarged longitudinal sections similar to FIGS. 4 and 5 for a second embodiment of the invention.
Figure 8:
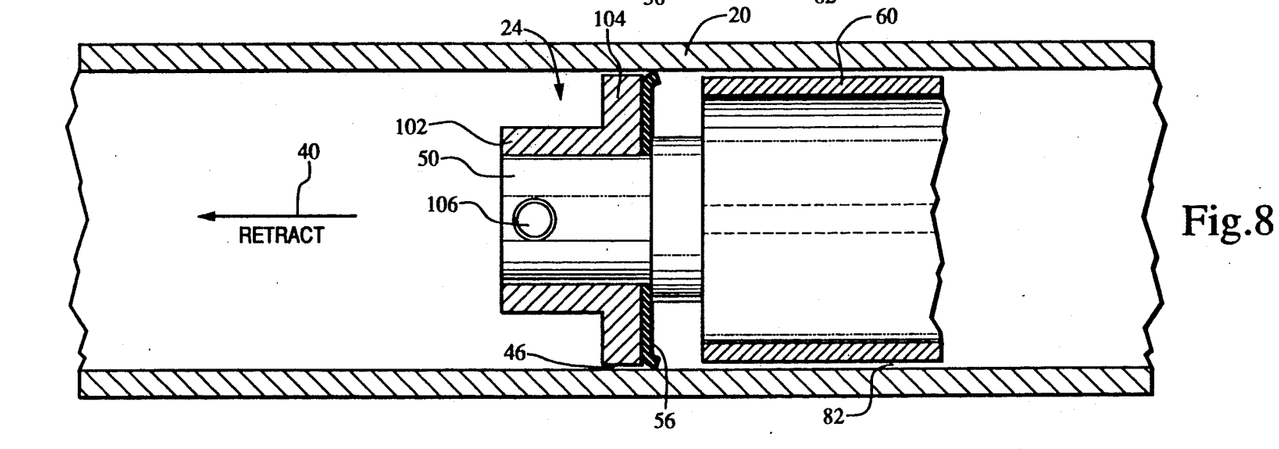

As best seen in FIGS. 4 and 5, head ring 44 is slidably displaceable on stub shaft 50 via a cross slot opening 84 through which a stationary cross pin 86 is received. In the forward stroke of piston 24 during which bar stock 22 is displaced toward lathe 12, counterbore 52 of piston head 44 is forced against the end face of annulus 54. At such time, the annular lip 88 of the piston ring is likewise displaced forward to deflect the periphery of seal 56 forwardly in the manner illustrated so as to continue the effect of clearance 46. With seal 56 deflected, cushioning fluid entering from clearance 46 can pass the seal and continue longitudinally into clearance 82 about the downstream components and bar stock 22 to the collection box 32. At such time as the bar stock 22 has been consumed or it is otherwise determined to retract the piston 24 within the guide tube 20, the hydraulic fluid 40 is withdrawn via reversible pump 28 that then produces a vacuum on the backside 42 of piston 24. The effect thereof is to withdraw the piston and restore it to its start-up location at the leftmost end of tube 20. During the return, it will be noted that the piston head 44 has been relatively displaced on cross pin 86 from the position of FIG. 4 to the position of FIG. 5. In so doing, lip 88 is backed off seal 56 permitting the seal to self-extend more radially upright into a sealing relationship with the interior surface of guide tube 20. a For the alternative embodiment disclosed in FIGS. 7 and 8, the ring head 44 of the previous embodiment has been replaced by a sleeve 102 having a flange 104 engageable on its forward radial face with the backside of flexible gasket 56 and secured via cross pin 106 to stub shaft 50. During the forward stroke illustrated in FIG. 7, pressurized hydraulic fluid 40 for cushioning flow 83 leaking through clearance 46 likewise forces peripheral collapse of seal 56 to continue longitudinally in clearance 82 toward the collection box 32. During the return stroke illustrated in FIG. 8, the self-extended peripheral lip of seal 56 reverts back against the face of flange 104 so as to essentially wipe against and seal the interior surface of guide tube 20 and enable the imposed vacuum force to be maintained.

Figure 9:
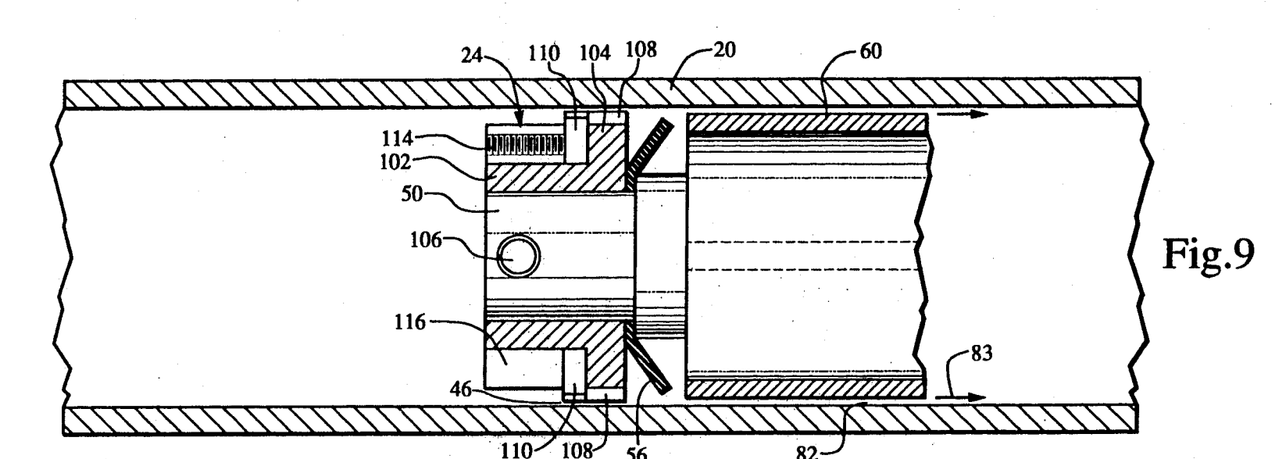
FIGS. 9 and 10 are fragmentary enlarged longitudinal sections similar to FIGS. 4 and 5 for a third embodiment of the invention.
Figure 10:
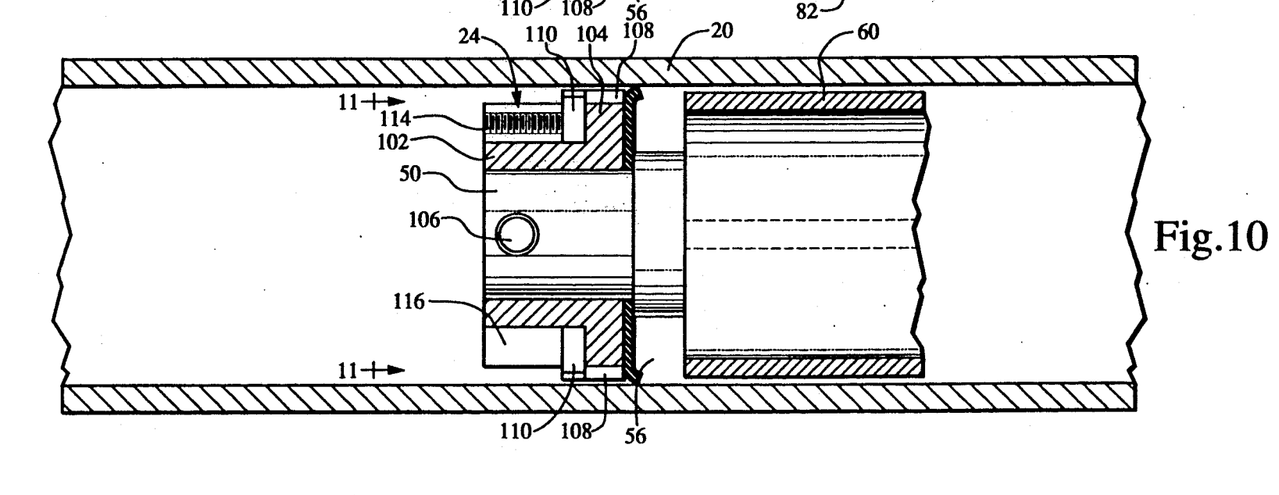
Figure 11:
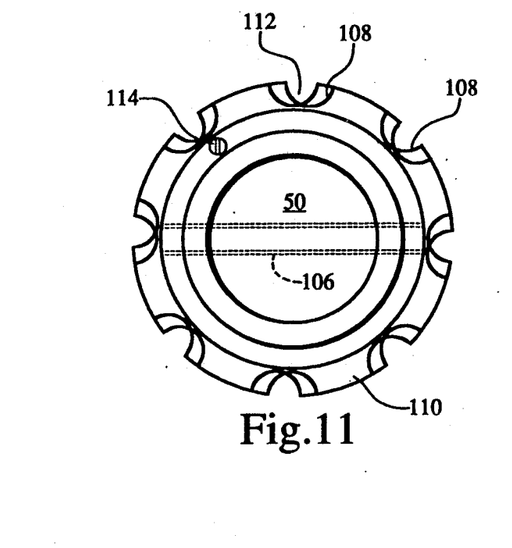
FIG. 11 is an end view as seen substantially from the position 11—11 of FIG. 10.

With reference to the embodiment of FIGS. 9–11, the quantity of cushion flow 83 against seal 56 is capable of being pre-adjusted and can be preset to suit. For that purpose, the flange 104 of retainer sleeve 102 includes a plurality of recesses 108 uniformly spaced about the circumference. A collar 110 is arcuately displaceable about the sleeve retainer and likewise includes a plurality of recesses of matched quantity and location with that of the flange 104. In this manner, the collar 110 can be arcuately displaced a desired extent to define a set size flow opening 112 between the settings of the respective recesses in the collar and flange. Once the flow opening 112 has been sized to suit, the collar can be locked into position via lock screw 114 in cylinder 116. Should it later become necessary to enlarge or reduce the size of the flow opening, lock screw 114 can be released so as to permit accurate adjustment of the collar relative to the flange. Operability is otherwise similar to that described in conjunction with FIGS. 7 and 8.

Figure 12:
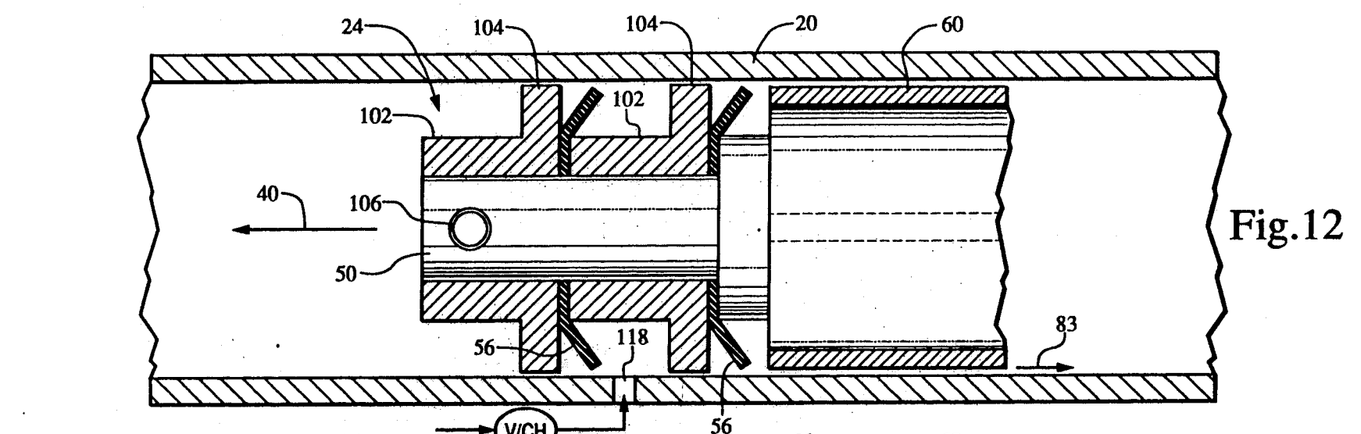
FIGS. 12 and 13 are fragmentary enlarged longitudinal sections similar to FIGS. 4 and 5 for a fourth embodiment of the invention.
Figure 13:
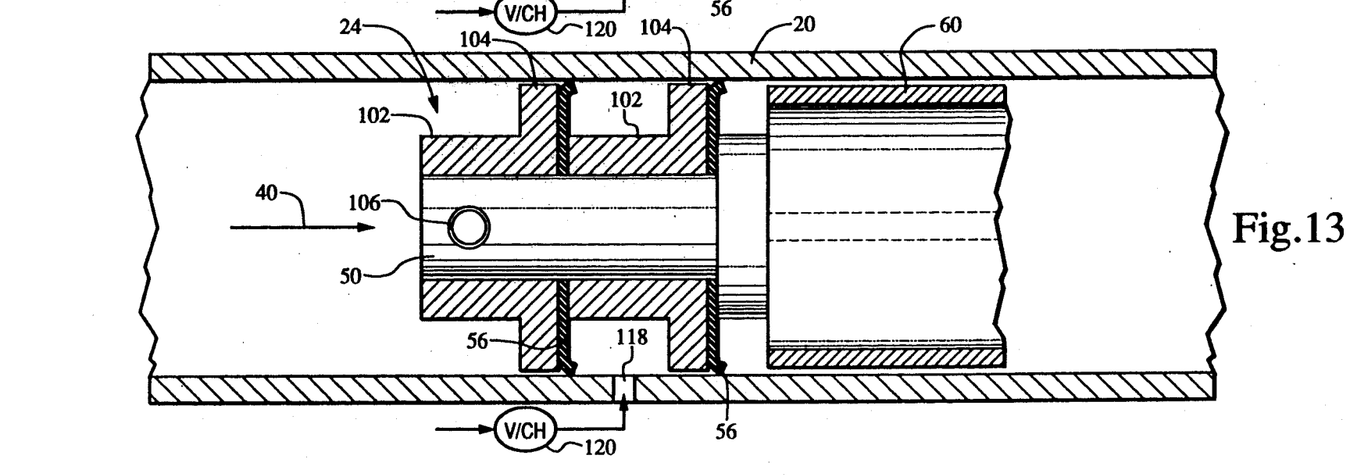

For the alternative embodiment of FIGS. 12 and 13, there is afforded in addition to cushioning fluid leaking through clearance 46, a side port 118 in the tube wall through which fluid 40 after passing through check valve 120 is introduced directly into the flow path. In this arrangement, a pair of spaced apart flexible seals 56 are contained in tandem by means of a pair of tandem retainers 102 with their corresponding flanges 104. In the forward stroke of FIG. 12, fluid 40 is introduced through port 118 along with leakage through clearance 46 and the entire cushion flow 83 comprises the combined flow entering through both clearance 46 and port 118. Seals 56 are deflected as described supra and at such time as the piston 24 is to be returned each of the seals 56 assume their naturally self-extended configuration against their flange 104 while port 118 is effectively closed via operation of check valve 120.

In the above description there is disclosed novel structure for supplying cushioning fluid 83 within the guide tube 20 flowing the length of the tube toward the collection box 32. Being that the cushioning fluid is supplied an an annular flow pattern about the piston and bar stock within defined and controlled clearances, uniform annular disbursement of the cushioning fluid results so as to afford the intended cushioning of the bar stock 22 contained therein. Such flow has been found to afford a distinct advantage in offsetting the effects of vibration that has otherwise been known to occur where cushion flow has been irregular or inadequate about the perimeter areas it is intended to protect. While not specified, the internal diameter of guide tube 20 can be varied to suit.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In a bar feed apparatus for supplying an elongated length of bar stock to an automatic lathe having a headstock adapted to receive the stock, said bar feed apparatus comprising:

an elongated guide tube in which to support the length of bar stock to be supplied and having a distal open end from which the bar stock can be gradually ejected;

support means supporting said guide tube with said distal open end in alignment with the head stock of a lathe to which the bar stock is to be supplied from said tube;

hydraulically operated piston means at the other end of said guide tube and effective when operable in a forward stroke to advance the bar stock from within said tube outward of said distal open end toward said headstock;

an adjustable annular clearance defined between the interior surface of said guide tube and said piston means for hydraulic fluid applied against said piston means to flow longitudinally within said tube from the past said piston means to past the bar stock for cushioning the bar stock therein: and recovery means at the distal end of said guide tube to recover hydraulic fluid discharging therefrom.

2. In a bar feed apparatus in accordance with claim 1 including a reservoir containing a supply of hydraulic fluid, a conduit connecting said reservoir with said piston means, a pump for supplying hydraulic fluid under pressure through said conduit to said piston means and said recovery means is operably connected to return recovered fluid to said reservoir.

3. In a bar feed apparatus in accordance with claim 2 in which said pump is operably reversible between supplying said hydraulic fluid and for generating a vacuum to effect retraction of said piston means.

4. In a bar feed apparatus for supplying an elongated length of bar stock to an automatic lathe having a headstock adapted to receive the stock, said bar feed apparatus comprising:

an elongated guide tube in which to support the length of bar stock to be supplied and having a distal open end from which the bar stock can be gradually ejected;

support means supporting said guide tube with said distal open end in alignment with the head stock of a lathe to which the bar stock is to be supplied from said tube;

hydraulically operated piston means at the other end of said guide tube and effective when operable in a forward stroke to advance the bar stock from within said tube outward of said distal open end toward said headstock, in which said piston means is retractable in a return stroke within said guide tube and has a head against which hydraulic pressure is applied to effect its forward stroke and there is included an annular seal of flexible composition and cross section downstream of said head, said seal being operably collapsible during the forward stroke of the piston means for permitting continued flow of the cushioning fluid longitudinally within said tube and is operably restored in a sealing relation against the surface of the tube wall during the return stroke of the piston means to effect a vacuum seal thereat;

an annular clearance defined between the interior surface of said guide tube and said piston means for hydraulic fluid applied against said piston means to flow longitudinally within said tube from past said piston means to past the bar stock for cushioning the bar stock therein; and recovery means at the distal end of said guide tube to recover hydraulic fluid discharging therefrom.

5. In a bar feed apparatus in accordance with claim 4 including adjustment means for varying the clearance flow area about said piston head to change the quantity of cushion flow fluid entering said clearance.

6. In a bar feed apparatus in accordance with claim 5 in which said adjustment means comprises a pair of contiguous elements defining said piston head, one of said elements being arcuately displaceable relative to the other and each have matching recesses which when relatively displaced are effective to vary the flow opening therethrough.

7. In a bar feed apparatus in accordance with claim 6 including means to secure the position setting of said one element for maintaining a set size of flow opening.

8. In a bar feed apparatus in accordance with claim 4 in which said piston head is comprised of a stub shaft axially positioned within said guide tube and a collar ring slidably displaceable on said stub shaft from a first forward position during said forward stroke forcing collapse of said seal and a second retracted position during the return stroke permitting said seal to cooperate with the interior surface of the guide tube for effecting a vacuum seal thereat.

9. In a bar feed apparatus in accordance with claim 8 in which there is included a side aperture defined through the wall of said guide tube through which controlled quantities of cushioning fluid can be introduced concomitantly with the cushioning fluid flow through said clearance.

10. A bar feed apparatus in accordance with claim 9 in which said seal includes a pair of seals axially separated from each other in a tandem relation and both seals are operable to collapse during said forward stroke and effect said vacuum seal during said return stroke.

11. In a bar feed apparatus for supplying an elongated length of bar stock to an automatic lathe having a headstock adapted to receive the stock, said bar feed apparatus comprising:

an elongated guide tube in which to support the length of bar stock to be supplied and having a distal open end from which the bar stock can be gradually ejected;

support means supporting said guide tube with said distal open end in alignment with the head stock of a lathe to which the bar stock is to be supplied from said tube;

hydraulically operated piston means at the other end of said guide tube and effective when operable in a forward stroke to advance the bar stock from within said tube outward of said distal open end toward said headstock, in which said piston means is retractable in a return stroke within said guide tube and has a head against which hydraulic pressure is applied to effect its forward stroke;

an annular clearance defined between the interior surface of said guide tube and said piston means for hydraulic fluid applied against said piston means to flow longitudinally within said tube from past said piston means to past the bar stock for cushioning the bar stock therein;

adjustment means for varying the clearance flow area about said piston head to change the quantity of cushion flow fluid entering said clearance; and recovery means at the distal end of said guide tube to recover hydraulic fluid discharging therefrom.

12. In a bar feed apparatus in accordance with claim 11 in which said adjustment means comprises a pair of contiguous elements defining said piston head, one of said elements being arcuately displaceable relative to the other and each have matching recesses which when relatively displaced are effective to vary the flow opening therethrough.

13. In a bar feed apparatus in accordance with claim 12 including means to secure the position setting of said one element for maintaining a set size of low opening.

14. In a bar feed apparatus in accordance with claim 11 in which said piston head is comprised of a stub shaft axially positioned within said guide tube and a collar ring slidably displaceable on said stub shaft from a first forward position during said forward stroke forcing collapse of said seal and a second retracted position during the return stroke permitting said seal to cooperate with the interior surface of the guide tube for effecting a vacuum seal thereat.

15. In a bar feed apparatus in accordance with claim 14 in which there is included a side aperture defined through the wall of said guide tube through which controlled quantities of cushioning fluid can be introduced concomitantly with the cushioning fluid flow through said clearance.

16. A bar feed apparatus in accordance with claim 15 in which said seal includes a pair of seals axially separated from each other in a tandem relation and both seals are operable to collapse during said forward stroke and effect said vacuum seal during said return stroke.

* * * * *